United States Patent [19]
Miller

[11] 3,902,349
[45] Sept. 2, 1975

[54] TOOTH GENERATING TOOL AND METHOD OF MAKING THE SAME
[75] Inventor: Robert L. Miller, Warren, Mich.
[73] Assignee: Ex-Cell-O Corporation, Highland Park, Mich.
[22] Filed: Feb. 19, 1974
[21] Appl. No.: 443,497

[52] U.S. Cl. ................................................. 72/469
[51] Int. Cl. ............................................. B21h 5/02
[58] Field of Search ........................... 72/469, 88, 90

[56] References Cited
UNITED STATES PATENTS
3,015,243  1/1962  Drader ................................. 72/469
3,084,572  4/1963  Starck .................................... 72/88
3,283,559  11/1966  Clerk ................................... 72/469

*Primary Examiner*—Milton S. Mehr
*Attorney, Agent, or Firm*—Malcolm R. McKinnon

[57] ABSTRACT

An improved tool for pressure generating teeth on the periphery of a cylindrical workpiece and an improved method of making such tool, the tool being provided with tooth forming teeth having a unique configuration which increases the strength of the teeth on the tools and the useful life of the tools.

2 Claims, 11 Drawing Figures

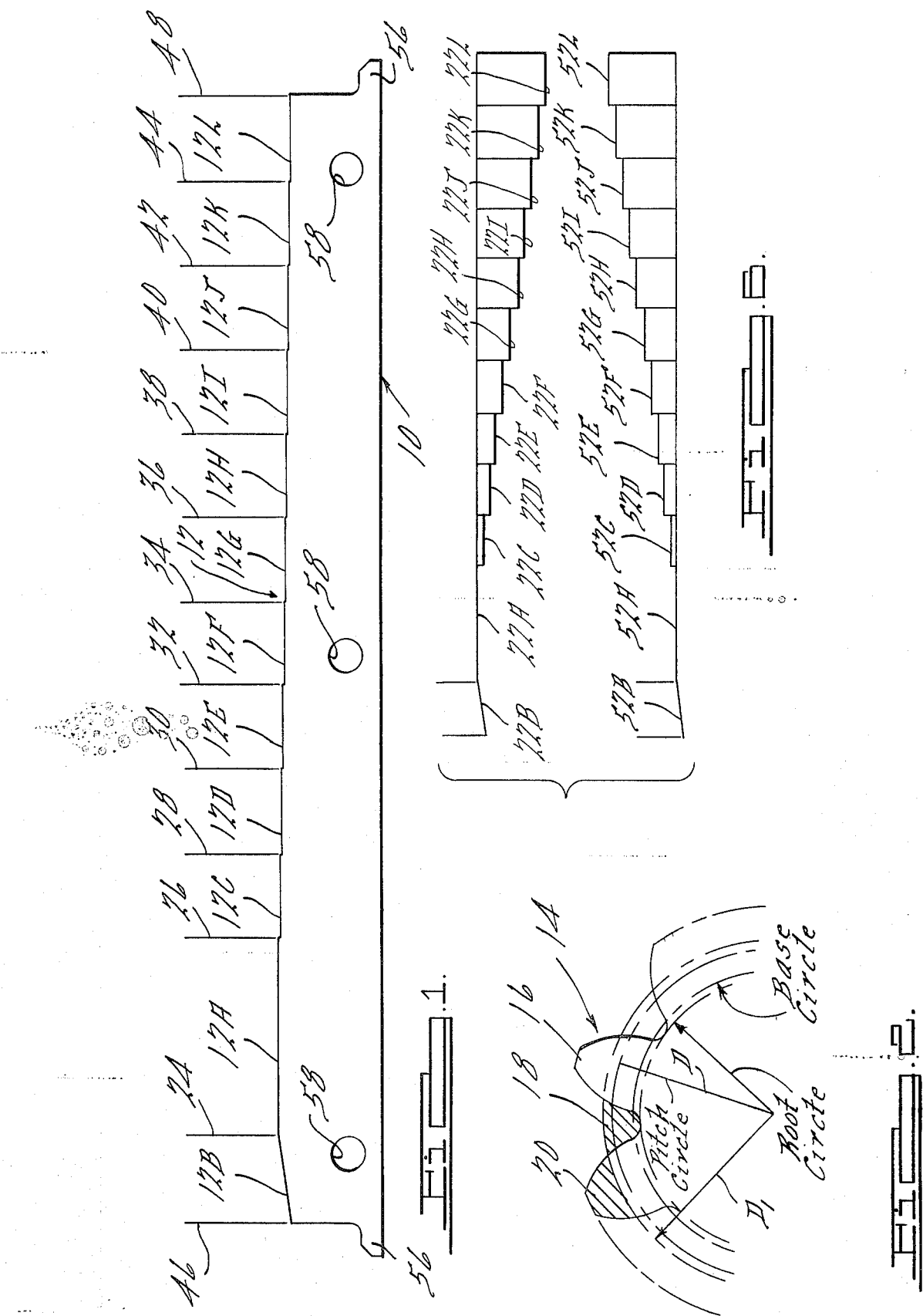

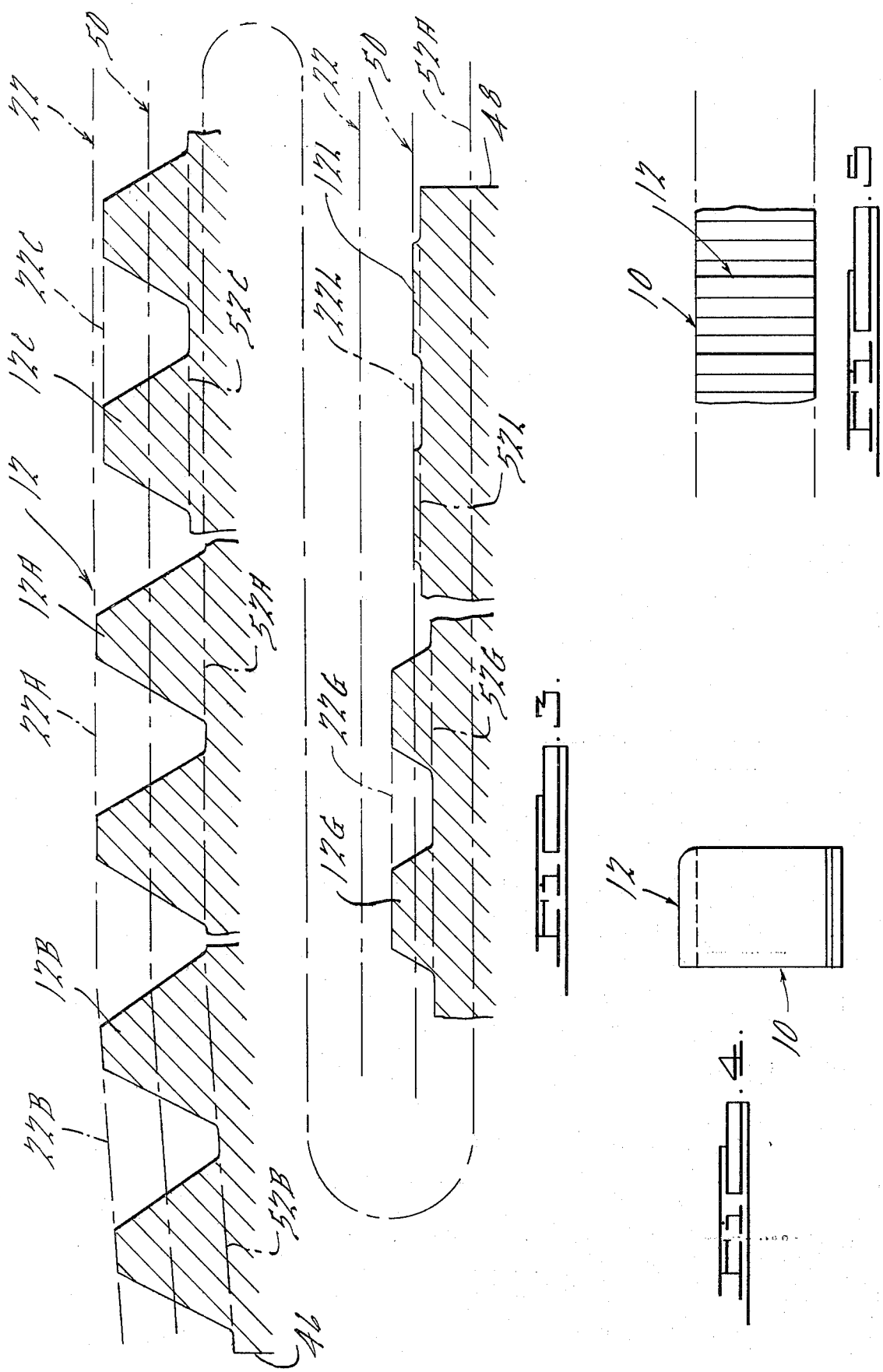

3,902,349

TOOTH GENERATING TOOL AND METHOD OF MAKING THE SAME

BRIEF SUMMARY OF THE INVENTION

This invention relates to tools for pressure generating toothed elements and, more particularly, to an improved tool for pressure generating teeth, such as spline teeth, gear teeth, worm teeth and the like, on the periphery of cylindrical workpieces while the workpieces are at ambient or room temperature and without removal of material from the workpieces. Heretofore, various tools have been utilized commercially to pressure form spline teeth, gear teeth, worm teeth and the like on the periphery of a cylindrical workpiece while the workpiece is at ambient or room temperature and without removing material from the workpiece. Examples of prior art tools which have achieved commercial success in this field are disclosed in U.S. Pat. No. 2,994,237 and 3,015,243, such tools being utilized, for example, in machines of the type disclosed in U.S. Pat. No. 2,995,964.

An object of the present invention is to provide an improved tooth generating tool of the indicated character incorporating improved teeth having a unique configuration which increases the strength of the teeth on the tool and the useful life of the tool.

Another object of the invention is to provide an improved method of making tools for pressure generating toothed elements which enables the quality production of such tools at relatively low unit cost.

Still another object of the invention is to provide an improved tool for pressure generating toothed elements which tool incorporates an improved tooth generating configuration which may be manufactured to precise tolerances and which is durable, efficient and reliable in operation.

The above as well as other objects and advantages of the present invention will become apparent from the following description, the appended claims and the accompanying drawings.

BRIEF DESCRIPTION OF THE DRAWINGS

FIG. 1 is a side elevational view of a rack type tool embodying the present invention;

FIG. 2 is a fragmentary view of a typical involute spline that can be pressure generated by tools embodying the present invention;

FIG. 3 is an enlarged, fragmentary and diagrammatic side elevational view of the teeth of the tool illustrated in FIG. 1;

FIG. 4 is an elevational view of the left end of the tool illustrated in FIG. 1;

FIG. 5 is a fragmentary, top plan view of the tool illustrated in FIG. 1;

FIG. 6 is a diagram illustrating the tip lines and the root lines of the teeth of the tool illustrated in FIG. 1.

DETAILED DESCRIPTION

Figure 7:
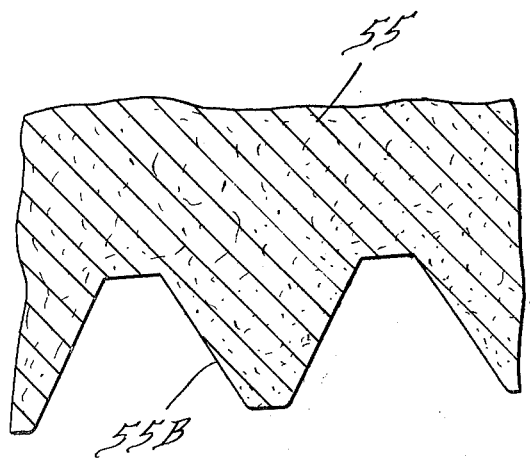
FIGS. 7 through 11 are fragmentary, sectional views of a grinding wheel and illustrating the manner in which such wheel may be successively dressed to form the teeth on the tool illustrated in FIG. 1 in accordance with the method of the present invention.
Figure 8:
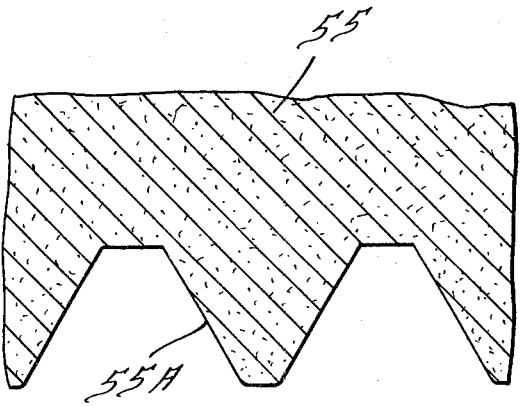

Referring to the drawings, a tool embodying the present invention is illustrated in FIGS. 1, 3, 4 and 5 thereof. The illustrated embodiment of the invention comprises a specific tooth construction for a rack type tool, generally designated 10, each tool preferably being utilized in substantially identical pairs to pressure form involute spline teeth, involute gear teeth and the like, as well as other types of teeth, on the periphery of a cylindrical workpiece. A machine in which a pair of rack type tools embodying the present invention may be utilized to pressure generate teeth on a workpiece by metal displacement is described in detail in the aforementioned U.S. Pat. No. 2,995,964 although it will be understood that tools embodying the present invention may be utilized in other types of machines. In general, a workpiece is positioned between a pair of tools 10 embodying the present invention, the tools being reciprocated in opposite directions across the workpiece to form teeth on the periphery of the workpiece. The workpiece is preferably supported by means which permit it to rotate freely about the longitudinal axis of the workpiece when urged to do so by tools embodying the present invention. The tools 10 are provided with teeth, generally designated 12, on their working faces that engage the periphery of the workpiece, and, in use, the tools are moved lengthwise by suitable means effective to move the tools simultaneously in opposite directions at the same velocity. The space between the working faces of the tools is less than the initial diameter of the workpiece with the result that the configuration of the working faces of the tools is impressed or conjugated on the periphery of the workpiece.

In forming teeth of the desired configuration on the periphery of the workpiece, the material from which the workpiece is made (ordinary steel) will flow adjacent the surface in radial and tangential directions so that there are grooves of less diameter than the original outside diameter of the workpiece and ridges of greater diameter than the original outside diameter of the workpiece. Since the final configuration of the workpiece must be accurately maintained, this flow of material should be taken into account in selecting the diameter of that portion of the workpiece which is subjected to the action of the tools embodying the present invention.

To illustrate by consideration of a common but very important shape that may be rolled by tools embodying the present invention, there is shown in FIG. 2 a portion of a cross-section of a workpiece 14 in finished form in which the workpiece has involute teeth or splines 16. Since no metal is removed in the cold rolling operation, the diameter of the workpiece prior to rolling cannot be either the final outside diameter or the root diameter. The rolling diameter $D_1$ of the workpiece 14 is selected so that the area 18 of removed tooth material below the $D_1$ periphery is equal to the area 20 of tooth material on a greater diameter than $D_1$. The diameter $D_1$, or substantially this diameter, defines the pitch line for rack type tools such as the tool 10. As will be described hereinafter in greater detail, the pressure angle or angle of obliquity of certain of the teeth of the tools 10 is the angle whose cosine is $D/D_1$ multiplied by the cosine of the pressure angle at the pitch diameter of the teeth 16 where $D$ is the pitch diameter of the workpiece 14. The base pitches of the tool and the workpiece are identical. With such a construction, the linear pitch of the teeth on the tool, as measured on the pitch line thereof, corresponds with the circular pitch of the teeth on the workpiece, as measured on a circle having the diameter $D_1$ of the workpiece. As will be described hereinafter in greater detail, the whole depth of at least some of the teeth on the tool 10 which engage the workpiece 14 is preferably the same as that of the workpiece, i.e., such tool teeth are fully conjugate to the teeth on the workpiece.

The spacing of the working faces of the tools is regulated so that the depth of the impressions made in the workpiece gradually increases as the rolling operation proceeds. That is to say the working faces approach closer together toward the longitudinal axis of the workpiece as the length of the stroke increases. This "approach" may be regarded as the feed of the tools into the workpiece as the tools move relative to the workpiece. In the embodiment of the invention illustrated, the convergence of the tool faces toward each other is accomplished by gradually increasing the height of the tool teeth while maintaining the pitch line of all sections of the tool teeth from the leading end of the tool to the section containing the fully conjugate teeth constant, a divergent section of the teeth being provided between the section containing the fully conjugate teeth and the trailing end of the tool to provide relief at the end of the working stroke of the tool to take up elasticity of the members and compression of oil films under rolling pressures. Only one pass of the tools with no reversal of direction during the working stroke is preferred.

FIGS. 1, 3, 4 and 5 illustrate a tool 10 embodying the present invention, it being understood that the tooth formation of the mating tool will be substantially identical. The numeral 22 designates a theoretical reference line which shows a "no taper" condition so that if the tops of the teeth on the tool remained on the line 22 there would be no change in spacing between the working faces of the tools as the tools moved relative to each other across the periphery of the workpiece. The teeth of the tool 10 are designated generally by the numeral 12, and, in the preferred embodiment of the invention illustrated, the teeth 12 are divided into 12 sections delineated by the vertical reference lines 24, 26, 28, 30, 32, 34, 36, 38, 40, 42, and 44 and the trailing and leading ends 46 and 48, respectively, of the tool. As shown in FIG. 3, the pitch line 50 of the tool teeth 12 is parallel to the reference line 22 from the leading end 48 of the tool 10 to the reference line 24, and the pitch line of the tool teeth 12 tapers downwardly away from the reference line 22 from the reference line 24 to the trailing end 46 of the tool. In accordance with the teaching of U.S. Pat. No. 3,015,243, the teeth 12A between the reference lines 24 and 26 are full sized and fully conjugate to the teeth to be formed on the workpiece and the pressure angle or the angle of obliquity of the teeth 12A is the angle whose cosine is $D/D_1$ multiplied by the cosine of the pressure angle at the pitch diameter of the teeth to be formed on the workpiece where D is the pitch diameter of the teeth of the workpiece. The teeth 12A between the reference lines 24 and 26 conjugate the final form of the teeth on the workpiece. Also, in accordance with the teachings of U.S. Pat. No. 3,015,243, and as previously mentioned, the pitch line of the teeth 12B between the reference line 24 and the trailing end 46 of the rack tapers downwardly away from the reference line 22 and the teeth 12B between the reference line 24 and the trailing end 46, while being substantially full-sized, are also relieved on the sides or flank faces thereof. This relief eliminates seam lines and other errors that might otherwise be formed on the teeth of the workpiece at the end of the stroke due to the decreased total area of the contact between the tools and the workpiece as the rolling pressures are reduced at the end of the stroke.

In accordance with the present invention, the pitch line of all of the teeth on the tool between the reference line 24 and the leading end 48 of the tool is determined by the diameter $D_1$ of the workpiece in the manner previously described so that the linear pitch of all of the teeth on the tool, as measured on the pitch line thereof, corresponds with the circular pitch of the teeth on the workpiece as measured on a circle having the diameter $D_1$ of the workpiece.

In the embodiment of the invention illustrated, between the leading end 48 of the tool and the reference line 26, the tool working face is divided into sections designated 12C through 12L, the teeth in the section 12L initially gripping the workpiece and initating its rotation. In use, the teeth 12L in the mating tools are spaced apart by a distance slightly less than the rolling diameter $D_1$ of the workpiece, as for example, the teeth 12L of the mating tools may be spaced apart a few thousandths of an inch less than the diameter $D_1$ of the workpiece.

The linear pitch of the teeth in the sections 12C through 12L is identical with the linear pitch of the teeth in the section 12A of the rack. The number of teeth in each of the sections 12C through 12L is preferably one-half the number of teeth in the workpiece, i.e., if there are twenty teeth in the workpiece, there will be ten teeth in each section 12C through 12L of the tool between the reference line 26 and the leading end 48 of the tool. It will be understood that a fewer or greater number of sections may be provided depending upon the size and number of the teeth in the workpiece.

It will be noted that the reference line 22 coincides with the reference line 22A tangent to the tops of the full-sized teeth 12 in the section of teeth on the tool between the reference lines 24 and 26. The reference line 52A is parallel to the reference lines 22 and 22A and is tangent to the roots of the teeth 12A between the reference lines 24 and 26. In accordance with the present invention, and as shown in FIG. 3, the root line 52C of the teeth 12C is disposed above the root line of the teeth 12A and the tip line 22C is disposed below the tip line 22A of the teeth 12A with the result that the teeth 12C have a slightly modified addenda and a slightly modified dedenda as compared with the full-sized teeth 12A. For example, the root 52C may be disposed 0.002 inches above the root line 52A of the teeth 12A and the tip line 22C may be disposed 0.002 inches below the tip line 22A of the teeth 12A. The root lines of the teeth in each successive section may be disposed 0.002 inches above the root line of the teeth in the preceding section in the direction toward the full height teeth and the tip lines of the teeth in each successive section may be disposed 0.002 inches below the tip line of the teeth in the preceding section in the direction toward the full height teeth.

Thus, in accordance with the present invention and as shown in FIG. 3, the top lands of the teeth 12C are disposed on a line parallel to the pitch line but are disposed below the top lands of the teeth 12A. The top lands of the teeth 12D through 12L are also disposed on lines parallel to the pitch line although disposed between the top lands of the teeth in the preceding sections. At the same time, the root lines of the teeth 12C through 12L are disposed above the root lines of the teeth in the preceding sections of teeth progressing toward the full-sized teeth 12A. The chordal thickness of the teeth 12C through 12L, as measured on the pitch line thereof, is constant progressing from the teeth 12C toward the full-sized teeth 12A while the distance between the teeth of successive sections, as measured on the pitch line, is also constant progressing from the teeth 12L toward the teeth 12A.

Thus, it will be seen that the root lines of the teeth in each successive section are progressively stepped downwardly from the leading end 48 of the tool to the full height teeth 12A while the top lands of the teeth in each successive section are progressively stepped upwardly from the leading end 48 to the line 22 defining the top lands of the full height teeth 12A.

FIG. 6 is illustrative of the relationship of the stepped tip lines and stepped root lines of the various sections of teeth 12 of the tool. Such a construction increases the strength of the teeth 12C through 12L which perform the greatest amount of work during the tooth forming operation. In effect, both the addenda and the dedenda of such teeth are truncated as compared with the full-sized teeth 12A. At the same time, deflection under load is reduced, thereby reducing the fatigue stresses imposed on the teeth of the tool and increasing the useful life of the tool.

In use, the teeth 12L of the tool initially engage and penetrate the workpiece slightly to initiate rotation thereof. The teeth 12K, 12J, 12I, 12H, etc. then successfully engage the workpiece and generate partial involute tooth configuration, which partial involute configuration is then gradually modified by the teeth in each successive section until the teeth 12A generate the full involute tooth configuration in the workpiece.

FIGS. 7 through 11 illustrate the novel method by which the teeth 12 of the tool 10 may be manufactured in accordance with the present invention. As shown in FIGS. 7 through 11, which are fragmentary, sectional views of a grinding wheel, generally designated 55, (adapted to be mounted for rotation on the spindle of a conventional grinding machine not shown) the periphery of the grinding wheel 55 is successively dressed to the complementary desired configurations, 55A through 55L, corresponding to the complementary configurations of each section of the various previously described sections of the teeth 12A through 12L of the tool 10. The tools 10 are preferably each initially formed from an elongated rectangular block of high grade tool steel, which may be heat treated or otherwise hardened as desired, a mating pair of tools 10 preferably being ground at the same time in side-by-side relationship on the grinding wheel table.

Figure 9:
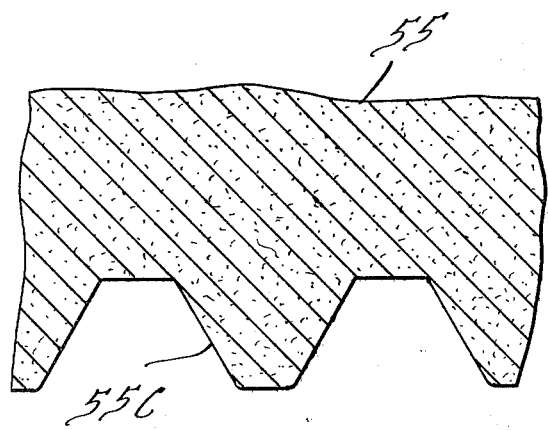
Figure 10:
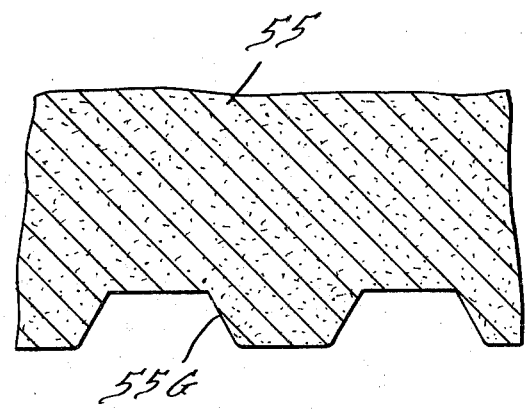
Figure 11:
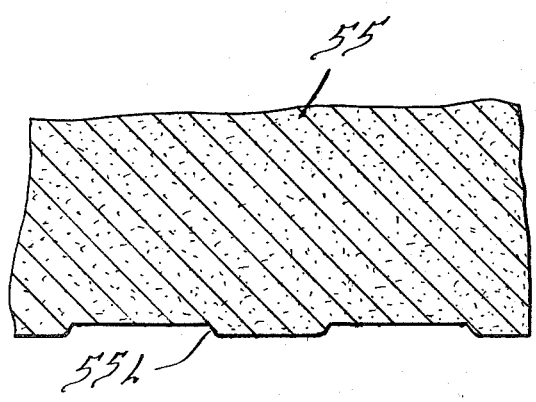

FIG. 7 illustrates a portion of the periphery of the grinding wheel 55 as dressed to grind the section 12B of the tool 10, it being understood that the width of the wheel will be sufficient to accommodate the desired width of each section of teeth. The rotating wheel (mounted on the spindle of a conventional grinding machine) is first traversed transversely of the mating blocks of tool steel to grind the section 12B after which the machine table is indexed to bring the section 12A beneath the grinding wheel while at the same time, the wheel is dressed by suitable means to the configuration illustrated in FIG. 8. The section 12A of the teeth 12 is then ground into the tool steel stock, and the tool is then successively indexed and the wheel dressed to the complementary desired configurations whereby the sections 12C through 12L may be ground as shown in FIGS. 9 through 11. It will be understood, however, that other means may be employed to machine the teeth 12 to the desired, aforementioned configuration. For example, such teeth may be generated by an angularly displaceable grinding wheel, or the teeth 12 may be machined by electrical, chemical, electro-chemical or other means to obtain the previously described configuration.

If desired, the leading and trailing edges of the stepped teeth 12C through 12L may be provided with varying radii as disclosed in U.S. Pat. No. 2,994,237 and, if desired, one or both of the top corners of the tool may be provided with a chamfer or radius, as illustrated in FIG. 4, to eliminate the necessity of undercutting the workpiece. FIG. 5 illustrates a plan view of the teeth 12 when such teeth are intended to generate spur teeth on the workpiece. It will be seen that the tool teeth 12 are perpendicular to the sides of the tool, i.e., perpendicular to the direction of tool movement but it will be understood that if the tools are to generate helical teeth on the workpiece, the tool teeth will be inclined to the sides of the tool or direction of tool movement, and the grinding wheel 55 will be appropriately adjusted to form such inclined teeth.

In the preferred embodiment of the invention illustrated, the body of the tool is illustrated as being provided with lugs 56 and transversely extending openings 58 which facilitate mounting the tool in machines of the type disclosed in U.S. Pat. No. 2,995,964, but it will be understood that other means may be utilized to mount the tools.

While a preferred embodiment of the tool and a preferred method of making the same have been illustrated and described, it will be understood that various changes and modifications may be made without departing from the spirit of the invention.

What is claimed is:

1. A tool for pressure generating teeth on the periphery of a cylindrical workpiece, said tool including a body having a leading end and a trailing end and being provided with a working face having a plurality of teeth thereon, said teeth being divided into sections each containing a multiplicity of teeth, all of said teeth having a common pitch line, a first section of said teeth being disposed between said leading end and said trailing end, each of said teeth in said first section having a configuration conjugate to the configuration of the teeth to be formed on the workpiece, a plurality of additional sections of teeth disposed between said leading end and said first section of teeth, each of said teeth in each of said sections including planar leading and trailing flank surface portions, each of said teeth in said additional sections including a planar top land, the top lands of the teeth in said additional sections being stepped and disposed in planes intermediate the top lands of the teeth in said first section and parallel to said pitch line, the root lines of the teeth in said additional sections being stepped and disposed intermediate and parallel to the root line of the teeth in said first section and said pitch line, the tooth thickness of all of said teeth in all of said sections as measured on the pitch line thereof being constant from section to section from the teeth in said first section to said leading end, the distance between the teeth in successive sections as measured on the pitch line thereof being constant progressing from said leading end to said first section of teeth.

2. A tool for pressure generating teeth on the periphery of a cylindrical workpiece, said tool being provided with a working face having a plurality of teeth thereon and including a leading end and a trailing end, said teeth being divided into sections each containing a multiplicity of teeth, all of said teeth having a common pitch line, a first section of teeth between said leading end and said trailing end being fully conjugate to the teeth to be formed on said workpiece, a plurality of additional sections of teeth disposed between said first section of teeth and said leading end, each of said teeth in each of said sections including planar leading and trailing flank surface portions, each of said teeth in said additional sections including a planar top land, the top lands of the teeth in said additional sections being stepped in equal increments from section to section and disposed in planes intermediate the top lands of the teeth in said first section and parallel to said pitch line, the root lines of the teeth in said additional sections being stepped in equal increments from section to section and disposed intermediate and parallel to the root line of the teeth in said first section and said pitch line, the tooth thickness of all of said teeth in all of said sections as measured on the pitch line thereof being constant from section to section from the teeth in said first section to said leading end, the distance between the teeth in successive sections as measured on the pitch line thereof being constant progressing from said leading end to said first section of teeth.

* * * * *